United States Patent Office 3,234,214
Patented Feb. 8, 1966

3,234,214
6-HALO-Δ$^{1,4,6}$-PREGNATRIENE-16α,17α-DIOL-3,
20-DIONE 16,17 ACETONIDE
Patrick A. Diassi, Westfield, and Josef Fried, Princeton,
N.J., assignors to Olin Mathieson Chemical Corporation, New York, N.Y., a corporation of Virginia
No Drawing. Filed Apr. 25, 1961, Ser. No. 105,289
6 Claims. (Cl. 260—239.55)

This invention relates to, and has for its objects the provisions of new physiologically active steroids, methods for preparing the same, and intermediates useful in such preparations.

The final products of this invention are steriods which are 16,17-acetal and ketal derivatives of 16α,17α-dihydroxy-1,4,6-pregnatriene steroids, and include steroids of the general formula

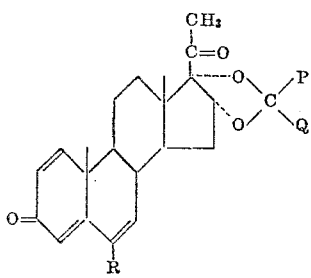

wherein R represents hydrogen, halogen (preferably bromo, chloro and fluoro), or lower alkyl; P is hydrogen, lower alkyl, halo lower alkyl, monocyclic cycloalkyl, monocyclic cycloalkyl lower alkyl, monocyclic aryl, monocyclic aryl lower alkyl, monocyclic hetercyclic or monocyclic heterocyclic lower alkyl; Q is lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; or together with carbon to which they are joined P and Q is a monocyclic cycloalkyl or monocyclic heterocyclic radical.

The final products of this invention are physiologically-active substances which possess progestational activity when administered both in the form of tablets and as a solution or suspension and hence can be used in lieu of known progestational agents, such as progesterone, in the treatment of habitual abortion. For this purpose, they can be administered in the same manner as progesterone, for example, the dosage being adjusted for the relative potency of the particular steroid. The compounds of this invention can also be administered per-orally in the form of tablets.

The compounds of this invention can be prepared by a number of different processes. In accordance with one process the compounds of this invention can be prepared by reacting a compound of the formula

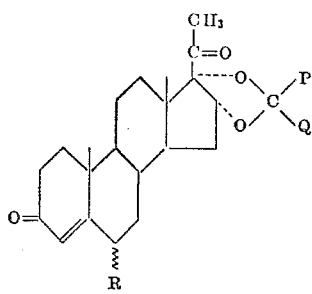

wherein R (in either the alpha or beta position), P and Q are as hereinbefore defined, with chloranil (2,3,5,6-tetrachlorobenzoquinone), whereby double-bonds are introduced between both 1 and 2 and the 6 and 7 positions, thereby yielding the final products of this invention. The reaction is conducted in sec.-amyl alcohol solvent at the reflux temperature of the solvent.

In accordance with a second process of this invention, the compounds of this invention can be prepared by reacting a compound of the formula

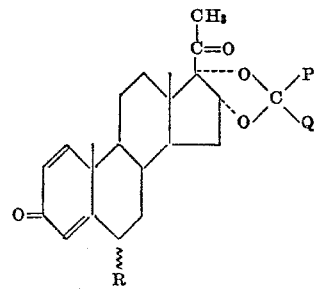

wherein R (in either the alpha or beta position), P and Q are as hereinbefore defined, with chloranil, whereby a double-bond is introduced between the 6 and 7 positions, thereby yielding the final products of this invention. The reaction is preferably conducted in an organic solvent for the steroid reactant, such as t-butanol, at an elevated temperature, preferably the reflux temperature of the solvent.

In accordance with a third process of this invention, the compounds of this invention can be prepared by reacting a compound of the formula

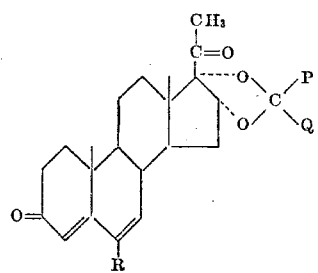

wherein R, P and Q are as hereinbefore defined, with 2,3-dichloro, 5,6-dicyanobenzoquinone, whereby a double-bond is introduced between the 1 and 2 positions, thereby yielding the final products of this invention. The reaction is preferably conducted in an organic solvent for the steroid reactant at an elevated temperature, preferably the reflux temperature of the solvent.

If a ketal or acetal grouping other than that present in the starting steroid reactant is desired, the resulting product may be cleaved by treatment with aqueous formic acid, as described in the application of Fried, Serial No. 84,989, filed January 26, 1961, now abandoned, followed by hydrolysis of the intermediate formic acid ester to yield new intermediates of this invention of the formula

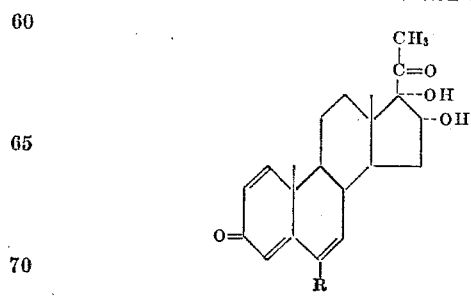

wherein R is as hereinbefore defined.

These new intermediates are then reacted with an aldehyde or ketone of the formula:

wherein P and Q are as hereinbefore defined. The reaction is preferably carried out by treating a suspension or solution of the dihydroxy steroid in the aldehyde or ketone (or an organic solvent and the aldehyde or ketone, if the aldehyde or ketone is a solid) with an acid catalyst (e.g., perchloric acid, p-toluenesulfonic acid, hydrochloric acid, etc.), neutralizing the acid and recovering the acetal or ketal derivative formed.

Suitable aldehyde and ketone reactants include lower alkanals of at least two carbon atoms, such as paraldehyde, propanal and hexanal; di(lower alkyl)ketones, such as acetone, diethylketone, dibutylketone, methylethylketone, and methylisobutylketone; cycloalkanones, such as cyclobutanone, cyclopentanone, cyclohexanone, suberone, and cyclodexanone; cycloalkyl (lower alkanals), such as cyclopropylcarboxaldehyde,
cyclobutylcarboxaldehyde,
cyclopentylcarboxaldehyde,
cyclohexylcarboxaldehyde,
cycloheptylcarboxaldehyde,
cyclooctylcarboxaldehyde,
cyclopropylacetaldehyde,
cyclobutylacetaldehyde,
cyclopentylacetaldehyde,
cyclohexylacetaldehyde,
β-cyclopentylpropionaldehyde,
γ-cyclohexylbutyraldehyde, and
3-cyclopropylcarproaldehyde;

cycloalkyl(lower alkanones), such as cyclopropyl methyl ketone, cyclobutyl ethyl ketone, cyclopentyl propyl ketone, cyclopentylmethyl methyl ketone, cyclohexylmethyl ethyl ketone, cyclopentylethyl ethyl ketone, cyclopropylpropyl methyl ketone, cyclohexyl n-pentyl ketone, cyclohexyl methyl ketone, and cyclooctyl methyl ketone; dicycloalkyl ketones, such as dicyclopropyl ketone, dicyclobutyl ketone, dicyclopentyl ketone, dicyclohexyl ketone, cyclopenyl cyclohexyl ketone, cyclopropylmethyl cyclopropyl ketone, 2-cyclobutylethyl cyclopropyl ketone, 3-cyclopentylmethyl cyclopentyl ketone, 5-cyclohexylhexyl cyclohexyl ketone, di(cyclopentylmethyl) ketone, cyclohexylmethyl cyclopentyl ketone, and di(4-cyclohexylpentyl) ketone; cycloalkyl monocyclic aromatic ketones, such as cyclopropyl phenyl ketone, cyclohexyl p-chlorophenyl ketone, cyclopentyl o-methoxyphenyl ketone, cyclopentyl o,p-dihydroxyphenyl ketone, cyclohexyl m-tolyl ketone, cyclopropyl p-ethylphenyl cyclopropyl p-nitrophenyl ketone, and cyclohexyl p-acetamidophenyl ketone; cycloalkyl(lower alkyl) monocyclic aromatic ketones, such as cyclopentylmethyl phenyl ketone; cycloalkyl monocyclic aromatic (lower alkyl) ketones, such as cyclopentyl benzyl ketone, cyclohexyl phenethyl ketone, and cyclobutyl benzyl ketone; cycloalkyl(lower alkyl) monocyclic aromatic (lower alkyl) ketones, such as cyclopentylmethyl benzyl ketones; cycloalkyl monocyclic heterocyclic ketones, such as cyclopentyl 2-furyl ketone, cyclohexyl 2-thienyl ketone, and cyclopropyl 2-pyridinyl ketone; cycloalkyl (lower alkyl)monocyclic heterocyclic ketones, such as cyclopentylmethyl 2-piperidinyl ketone, cyclohexylethyl 2-morpholinyl ketone and cyclopropyl 2-thienyl ketone; cycloalkyl monocyclic heterocyclic (lower alkyl)ketones, such as cyclopentyl thenyl ketone, cyclohexyl furfuryl ketone and cyclopropyl 2-piperdinylmethyl ketone; halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes, such as benzaldehyde, halobenzaldehydes (e.g., p-chlorobenzaldehyde and p-fluorobenzaldehyde), lower alkoxybenzaldehydes (e.g., o-anisaldehyde), di(lower alkoxy)benzaldehydes (e.g., veratraldehyde), hydroxybenzaldehydes (e.g. salicylaldehyde), dihydroxybenzaldehydes (e.g. resorcylaldehyde), lower alkyl benzaldehydes (e.g., m-tolualdehyde and p-ethylbenzaldehyde), di(lower alkyl)benzaldehydes (e.g. o,p-dimethylbenzaldehyde), nitrobenzaldehydes, acylamidobenzaldehydes (e.g. N-acetylanthranilaldehyde), and cyanobenzaldehydes; monocyclic carboxylic aromatic lower alkanals, such as phenylacetaldehyde, α-phenylpropionaldehyde, β-phenylpropionaldehyde, γ-phenylbutyraldehyde, and aromatically-substituted halo lower alkoxy, hydroxy, lower alkyl, nitro, acylamido and cyano derivatives thereof; monocyclic heterocyclic aldehydes, such as picolinaldehydes, furfural, thiophen carbonals, and halo, lower alkoxy, hydroxy, lower alkyl, nitro, and cyano derivatives thereof; monocyclic heterocyclic lower alkanals; monocyclic carbocyclic aromatic ketones, such as acetophenone, α,α,α-trifluoroacetophenone, propiophenone, butyrophenone, valerophenone, isocaprophenone, halophenyl lower alkyl ketones (e.g. p-chloroacetophenone and p-chloropropiophenone), (lower alkoxy) phenyl lower alkyl ketones (e.g. p-anisyl methyl ketone), di(lower alkoxy)phenyl lower alkyl ketones, hydroxyphenyl lower alkyl ketones, dihydroxyphenyl lower alkyl ketones (e.g. resacetophenone), (lower alkyl)phenyl lower alkyl ketones (e.g. methyl p-tolyl ketone), di(lower alkyl)phenyl lower alkyl ketones (o,p-xylyl methyl ketone), nitrophenyl lower alkyl ketones (e.g. p-nitroacetophenone), acylamidophenyl lower alkyl ketones (e.g. acetyl anilines), and cyanophenyl lower alkyl ketones; benzophenone, and mono or bis substituted halo, lower alkoxy, hydroxy, lower alkyl, nitro, acylamido and cyano derivatives thereof; monocyclic carbocyclic aromatic lower alkanones, such as 1-phenyl-3-butanone and 1-phenyl-4-pentanone, and aromatically substituted derivatives thereof; monocyclic heterocyclic ketones, such as 2-acetylfuran, 2-benzoylfuran, 2-acetyl-thiophene and alloxan; and monocyclic heterocyclic lower alkanones.

Among the suitable initial steroid reactants may be mentioned the 16,17-acetals and ketals of each of the following steroids with one of the aldehydes or ketones listed hereinbefore:

16α,17α-dihydroxyprogesterone;
6-halo-16α,17α-dihydroxyprogesterones,
such as
6α-fluoro-16α,17α-dihydroxyprogesterone,
6β-fluoro-16α,17α-dihydroxyprogesterone,
6α-chloro-16α,17α-dihydroxyprogesterone,
6β-chloro-16α,17α-dihydroxyprogesterone,
6α-bromo-16α,17α-dihydroxyprogesterone and
6β-bromo-16α,17α-dihydroxyprogesterone;
6-(lower alkyl)-16α,17α-dihydroxyprogesterones,
such as
6α-methyl-16α,17α-dihydroxyprogesterone,
6β-methyl-16α,17α-dihydroxyprogesterone and
6α-ethyl-16α,17α-dihydroxyprogesterone;
1-dehydro-16α,17α-dihydroxyprogesterone;
1-dehydro-6-halo-16α,17α-dihydroxyprogesterones,
such as
1-dehydro-6α-fluoro-16α,17α-dihydroxyprogesterone,
1-dehydro-6β-fluoro-16α,17α-dihydroxprogesterone,
1-dehydro-6α-chloro-16α,17α-dihydroxprogesterone,
1-dehydro-6β-chloro-16α,17α-dihydroxyprogesterone,
1-dehydro-6α-bromo-16α,17α-dihydroxyprogesterone and
1-dehydro-6β-bromo-16α,17α-dehydroxyprogesterone;
1-dehydro-6-(lower alkyl)-16α,17α-dihydroxyprogesterones,
such as
1-dehydro-6α-methyl-16α,17α-dihydroxyprogesterone,
1-dehydro-6β-methyl-16α,17α-dihydroxyprogesterone and
1-dehydro-6α-ethyl-16α,17α-dihydroxprogesterone;
6-dehydro-16α,17α-dihydroxyprogesterone;
6-dehydro-6-halo-16α,17α-dihydroxyprogesterones, such as
6-dehydro-6-fluoro-16α,17α-dihydroxyprogesterone,
6-dehydro-6-chloro-16α,17α-dihydroxprogesterone and
6-dehydro-6-bromo-16α,17α-dihydroxyprogesterone; and
6-dehydro-6-(lower alkyl)-16α,17α-dihydroxyprogesterones,
such as
6-dehydro-6-methyl-16α,17α-dihydroxyprogesterone and
6-dehydro-6-ethyl-16α,17α-dihydroxyprogesterone.

Those starting steroids which are of the progesterone series are either known in the art or can be prepared as described in our application, Serial No. 99,732, filed March 31, 1961. Those starting steroids which are of the 6-dehydroprogesterone series can be prepared as also described in said application. Those starting steroids which are of the 1-dehydroprogesterone series can be prepared as described in our application, Serial No. 105,262, filed on even date herewith.

To prepare the free 16α,17α-dihydroxy steroids of this invention, the acetal or ketal group is cleaved by treatment with aqueous formic acid. If concentrated aqueous formic acid is used (e.g., 90% formic acid), a 16-formic acid ester is formed which is then hydrolyzed by treatment with 10% aqueous potassium carbonate to yield the free 16,17-dihydroxy steroid derivative. These intermediates can then be converted to one of the 16,17-acetals or ketals of this invention by treatment with one of the aldehydes or ketones mentioned hereinbefore in the presence of an acid catalyst (e.g., perchloric acid).

The following examples illustrate the invention (all temperatures being in centigrade):

*Example 1.—$\Delta^{1,4,6}$-pregnatriene-16α,17α-diol-3,20-dione 16,17-acetonide*

To a warm solution of 1.0 g. of $\Delta^4$-pregnene-16α,17α-diol-3,20-dione 16,17-acetonide in 70 ml. of sec.-amyl alcohol is added 1.8 g. of chloranil and the mixture is refluxed for 3 hours. After cooling to room temperature the mixture is filtered and the filtrate evaporated to dryness, in vacuo. The residue is dissolved in 60 ml. of ether and washed successively with water until the aqueous phase is colorless, then four times with 30 ml. of 5% sodium hydroxide, then with water again until neutral, dried over sodium sulfate, filtered and evaporated to dryness in vacuo. The residue is dissolved in 50 ml. of benzene and adsorbed into 25 g. of Woelm neutral alumina. Elution with chloroform-benzene (1:9) and evaporation of the solvent gives $\Delta^{1,4,6}$-pregnatriene-16α,17α-diol-3,20-dione 16,17-acetonide.

*Example 2.—$\Delta^{1,4,6}$-pregnadiene-16α,17α-diol-3,20-dione 16,17-acetophenonide*

To a warm solution of 1.0 g. of $\Delta^4$-pregnene-16α,17α-diol-3,20-dione 16,17-acetophenonide in 70 ml. of sec.-amyl alcohol is added 1.8 g. of chloranil and the mixture is refluxed for 3 hours. The mixture is then cooled and filtered and the filtrate evaporated to dryness, in vacuo. The residue is dissolved in 60 ml. of ether and washed three times with 30 ml. portions of water, then four times with 30 ml. portions of 5% sodium hydroxide, and then again with water until neutral. The ether is dried over sodium sulfate, filtered and evaporated to dryness, in vacuo. Chromatography of the residue on Woelm neutral alumina give a fraction on elution with 5% chloroform in benzene which on evaporation of the solvent gives $\Delta^{1,4,6}$-pregnatriene-16α,17α-diol-3,20-dione 16,17-acetophenonide.

*Example 3.—16α17α-chloral derivative of $\Delta^{1,4,6}$-pregnatriene-16α,17α-diol-3,20-dione*

Following the procedure of Example 1 but substituting an equivalent amount of the 16α,17α-chloral derivative of 16α,17α-dihydroxyprogesterone for the 16α,17α-dihydroxyprogesterone 16,17-acetonide, the 16α,17α-chloral derivative of $\Delta^{1,4,6}$-pregnatriene-16α,17α-diol-3,20-dione is obtained.

*Example 4.—Dicyclopropyl ketone derivative of $\Delta^{1,4,6}$-pregnatriene-16α,17α-diol-3,20-dione*

Following the procedure of Example 1 but substituting an equivalent amount of the 16α,17α-dicyclopropyl ketone derivative of 16α,17α-dihydroxyprogesterone for the 16α,17α-dihydroxyprogesterone 16,17-acetonide, the dicyclopropyl ketone derivative of $\Delta^{1,4,6}$-pregnatriene-16α,17α-diol-3,20-dione is obtained.

Similarly, the methylisobutyl ketone derivative, the cyclopropyl phenyl ketone derivative, the cyclohexyl methyl ketone derivative, the 1,1,1-trifluoroacetonide derivative, the heptafluorobutanal derivative, the p-chloroacetophenone derivative, the p-nitroacetophenone derivative, the benzaldehyde derivative, the furfural derivative, the benzophenone derivative and the 2-acetylfuran derivative of 16α,17α-dihydroxyprogesterone, yield the methylisobutyl ketone, the cyclopropyl phenyl ketone, the cyclohexyl methyl ketone, the 1,1,1-trifluoroacetonide, the heptafluorobutanal, the p-chloroacetophenone, the p-nitroacetophenone, the benzaldehyde, the furfural, the benzophenone and the 2-acetylfuran derivatives of $\Delta^{1,4,6}$-pregnatriene-16α,17α-diol-3,20-dione, respectively.

*Example 5.—6-chloro-$\Delta^{1,4,6}$-pregnatriene-16α,17α-diol-3,20-dione 16,17-acetonide*

To a solution of 4.0 g. of 6β-chloro-$\Delta^4$-pregnene-16α,17α-diol-3,20-dione 16,17-acetonide in 280 ml. of sec.-amyl alcohol is added 7.28 g. of chloranil and the mixture is refluxed for 27 hours. After cooling the undissolved chloranil is filtered and the filtrate evaporated to dryness, in vacuo. The residue is dissolved in 400 ml. of ether, washed with water until the aqueous phase is colorless, then four times with 50 ml. portions of 5% sodium hydroxide, followed by water until neutral, and dried over sodium sulfate, filtered and evaporated to dryness in vacuo. The residue is chromatographed on 108 g. of Woelm neutral alumina by which fractions are obtained on elution with 5% chloroform in benzene which on crystallization from acetone-hexane give of 6-chloro-$\Delta^{1,4,6}$-pregnatriene-16α,17α-diol-3,20-dione 16,17-acetonide.

*Example 6*

Following the procedure of Example 5, but substituting 4.0 g. of 6α-chloro-16α,17α-dihydroxyprogesterone 16,17-acetonide for the 6β-chloro-16α,17α-dihydroxyprogesterone 16,17-acetonide, 6-chloro-$\Delta^{1,4,6}$-pregnatriene-16α,17α-diol-3,20-dione 16,17-acetonide is obtained.

*Example 7.—6-fluoro-$\Delta^{1,4,6}$-pregnatriene-16α,17α-diol-3,20-dione 16,17-acetonide*

Following the procedure of Example 5, but substituting 4.1 g. of 6α-fluoro-16α,17α-dihydroxyprogesterone 16,17-acetonide for the 6β-chloro-16α,17α-dihydroxyprogesterone 16,17-acetonide, 6-fluoro-$\Delta^{1,4,6}$-pregnatriene-16α,17α-diol-3,20-dione 16,17-acetonide is obtained.

*Example 8*

Following the procedure of Example 5, but substituting 4.1 g. of 6β-fluoro-16α,17α-dihydroxyprogesterone 16,17-acetonide for the 6β-chloro-16α,17α-dihydroxy-progesterone 16,17-acetonide, 6-fluoro-$\Delta^{1,4,6}$-pregnatriene-16α,17α-diol-3-3,20-dione 16,17-acetonide is obtained.

*Example 9.—6-bromo-$\Delta^{1,2,6}$-pregnatriene-16α,17α-diol-3,20-dione 16,17-acetonide*

Following the procedure of Example 5, but substituting 4.0 g. of 6α-bromo-16α,17α-dihydroxyprogesterone 16,17-acetonide for the 6β-chloro-16α,17α-dihydroxy-progesterone 16,17-acetonide, 6-bromo-$\Delta^{1,4,6}$-pregnatriene-16α,17α-diol-3,20-dione 16,17-acetonide is obtained.

Example 10

Following the procedure of Example 5, but substituting 4.0 g. of 6β-bromo-16α,17α-dihydroxyprogesterone 16,17-acetonide for the 6β-chloro-16α,17α-dihydroxyprogesterone 16,17-acetonide 6-bromo-$\Delta^{1,4,6}$-pregnatriene-16α,17α-diol-3,20-dione 16,17-acetonide is obtained.

Example 11.—6-fluoro-$\Delta^{1,4,6}$-pregnatriene-16α,17α-diol-3,20-dione 16,17-acetophenonide Following the procedure of Example 5, but substituting 4.2 g. of 6α-fluoro-16α,17α-dihydroxyprogesterone 16,17-acetophenonide for the 6β-chloro-16α,17α-dihydroxyprogesterone 16,17-acetonide, 6-fluoro-$\Delta^{1,4,6}$-pregnatriene-16α,-17α-diol-3,20-dione 16,17-acetophenonide is obtained.

Example 12

Following the procedure of Example 5, but substituting 4.2 g. of 6β-fluoro-6α,17α-dihydroxyprogesterone 16,17-acetophenonide for the 6β-chloro-16α,17α-dihydroxyprogesterone 16,17-acetonide, 6-fluoro-$\Delta^{1,4,6}$-pregnadiene-16α,17α-diol-3,20-dione 16,17-acetophenonide is obtained.

Similarly, 16α,17α-(2'-butylidene)-16α,17α-dihydroxy-6β-fluoroprogesterone, 16α,17α-(4'-methyl-2'-pentylidene)-16α,17α-dihydroxy-6β-chloroprogesterone, 16α,17α-cyclohexylidene 16α,17α-dihydroxy-6β-fluoroprogesterone and 16α,17α-(3'-pentylidene)-16α,17α-dihydroxy-6β-fluoroprogesterone yield their respective $\Delta^{1,4,6}$-pregnatriene derivatives.

Example 13.—6-methyl-1,6-bis-dehydro-16α,17α-dihydroxyprogesterone-16α,17α-acetonide A solution of 100 mg. of 6α-methyl-16α,17α-dihydroxyprogesterone 16α,17α-acetonide and 200 mg. of chloranil in 5 ml. of sec.-amyl alcohol is refluxed for 10 hours. The cooled reaction mixture is then worked up as in Example 1 to yield 6-methyl-$\Delta^{1,4,6}$-pregnatriene-16α,17α-diol-3,20-dione 16α,17α-acetonide.

Example 14

Following the procedure of Example 13 but substituting an equivalent amount of 6β-methyl-16α,17α-dihydroxyprogesterone-16,17-acetonide for the 6α-methyl 16α,17α-dihydroxyprogesterone 16,17-acetonide, 6-methyl-$\Delta^{1,4,6}$-pregnatriene-16α,17α-diol-3,20-dione 16,17-acetonide is obtained.

Example 15.—6-methyl-$\Delta^{1,4,6}$-pregnatriene-16α,17α-diol-3,20-dione 16,17-acetophenonide Following the procedure of Example 13 but substituting an equivalent amount of 6α-methyl-16α,17α-dihydroxyprogesterone 16,17-acetophenonide for the 6α-methyl-16α,17α-dihydroxyprogesterone 16,17-acetophenonide for the 6α-methyl-16α,17α-dihydroxyprogesterone 16,17-acetonide, 6-methyl-$\Delta^{1,4,6}$-pregnatriene-16α,17α-diol-3,20-dione 16,17-acetophenonide is obtained.

Example 16.—$\Delta^{1,4,6}$-pregnatriene-16α,17α-diol-3,20-dione 16,17-acetophenonide To a solution of 1.0 g. of $\Delta^{4,6}$-pregnadiene-16α,17α-diol-3,20-dione 16,17-acetophenonide in 15 ml. of dioxane, 531 mg. of 2,3-dichloro-5,6-dicyanobenzoquinone is added and the mixture is refluxed for 6 hours. After cooling, the precipitated 2,3-dichloro-5,6-dicyanohydroquinone is filtered off and washed with 5 ml. of dioxane. The filtrate is then evaporated to dryness in vacuo and the residue dissolved in 50 ml. of benzene and adsorbed onto 25 g. of Woelm neutral alumina. Elution with chloroform-benzene (1:9) and evaporation of the solvent gives $\Delta^{1,4,6}$-pregnatriene-16α,17α-diol-3,20-dione 16,17-acetophenonide having characteristic absorption maxima in ethanol at 224 mμ

($E^{1\%}_{1\text{cm.}}$ 233), 265 mμ ($E^{1\%}_{1\text{cm.}}$ 247) and 294 mμ ($E^{1\%}_{1\text{cm.}}$ 334).

Example 17.—16α,17α-chloral derivative of $\Delta^{1,4,6}$-pregnatriene-16α,17α-diol-3,20-dione Following the procedure of Example 16, but substituting an equivalent amount of the 16α,17α-chloral derivative of $\Delta^{4,6}$-pregnadiene-16α,17α-diol-3,20-dione for the $\Delta^{4,6}$-pregnadiene-16α,17α-diol-3,20-dione 16,17-acetophenonide, the 16α,17α-chloral derivative of $\Delta^{1,4,6}$-pregnatriene-16α,17α-diol-3,20-dione is obtained.

Example 18.—Dicyclopropyl ketone derivative of $\Delta^{1,4,6}$-pregnatriene-16α,17α-diol-3,20-dione Following the procedure of Example 16, but substituting an equivalent amount of the 16α,17α-dicyclopropyl ketone derivative of $\Delta^{4,6}$-pregnadiene-16α,17α-diol-3,20-dione for the acetophenonide, the dicyclopropyl ketone derivative of $\Delta^{1,4,6}$-pregnatriene-16α,17α-diol-3,20-dione is obtained.

Similarly, the methyl isobutyl ketone derivative, the cyclopropyl phenyl ketone derivative, the cyclohexyl methyl ketone derivative, the 1,1,1-trifluoroacetonide derivative, the heptafluorobutanal derivative, the p-chloracetophenone derivative, the p-nitroacetophenone derivative, the benzaldehyde derivative, the furfural derivative, the benzophenone derivative, the 2-acetylfuran derivative and the acetone derivative of $\Delta^{4,6}$-pregnadiene-16α,17α-diol-3,20-dione, yield the methyl isobutyl ketone, the cyclopropyl phenyl ketone, the cyclohexyl methyl ketone, the 1,1,1-trifluoroacetonide, the heptafluorobutanal, the p-chloroacetophenone, the p-nitroacetophenone, the benzaldehyde, the furfural, the benzophenone, the 2-acetylfuran and the acetone derivatives of $\Delta^{1,4,6}$-pregnatriene-16α,17α-diol-3,20-dione, respectively.

Example 19.—6-chloro-$\Delta^{1,4,6}$-pregnatriene-16α,17α-diol-3,20-dione 16,17-acetonide To a solution of 1.0 g. of 6-chloro-$\Delta^{4,6}$-pregnadiene-16α,17α-diol-3,20-dione 16,17-acetonide in 15 ml. of dioxane, 530 mg. of 2,3-dichloro-5,6-dicyanobenzoquinone is added and the mixture is refluxed for 6 hours. After cooling, the precipitated 2,3-dichloro-5,6-dicyanohydroquinone is filtered off and washed with 5 ml. of dioxane. The filtrate is then evaporated to dryness in vacuo and worked up as in Example 16 to give 6-chloro-$\Delta^{1,4,6}$-pregnatriene-16α,17α-diol-3,20-dione 16,17-acetonide.

Example 20.—6-fluoro-$\Delta^{1,4,6}$-pregnatriene-16α,17α-diol-3,20-dione 16,17-acetonide Following the procedure of Example 19 but substituting 1.0 g. of 6-fluoro-$\Delta^{4,6}$-pregnadiene-16α,17α-diol-3,20-dione 16,17-acetonide for the 6-chloro compound, 6-fluoro-$\Delta^{1,4,6}$-pregnatriene-16α,17α-diol-3,20-dione 16,17-acetonide is obtained.

Example 21.—6-bromo-$\Delta^{1,4,6}$-pregnatriene-16α,17α-diol-3,20-dione 16,17-acetonide Following the procedure of Example 19 but substituting 1.0 g. of 6-bromo-$\Delta^{4,6}$-pregnadiene-16α,17α-diol-3,20-dione 16,17-acetonide for the 6-chloro compound, 6-bromo-$\Delta^{1,4,6}$-pregnatriene-16α,17α-diol-3,20-dione 16,17-acetonide is obtained.

Similarly, 6-fluoro-$\Delta^{4,6}$-pregnadiene-16α,17α-diol-3,20-dione 16,17-acetophenonide, 16α,17α-(2'-butylidene)-6-fluoro-$\Delta^{4,6}$-pregnadiene-16α,17α-diol-3,20-dione, 16α,17α-(4'-methyl-2'-pentylidene)-6-chloro-$\Delta^{4,6}$-pregnadiene-16α,17α-diol-3,20-dione, 16α,17α-cyclohexylidene-6-fluoro-$\Delta^{4,6}$-pregnadiene-16α,17α-diol-3,20-dione and 16α,17α-(3'-pentylidene)-6-fluoro-$\Delta^{4,6}$-pregnadiene-16α,17α-diol-3,20-dione yield their respective $\Delta^{1,4,6}$-pregnatriene derivatives.

Example 22.—6-methyl-$\Delta^{1,4,6}$-pregnatriene-16α,17α-diol-3,20-dione 16,17α-acetonide To a solution of 1.0 g. of 6-methyl-$\Delta^{4,6}$-pregnadiene-16α,17α-diol-3,20-dione 16,17-acetonide in 15 ml. of dioxane, 531 mg. of 2,3-dichloro-5,6-dicyanobenzoquinone is added and the mixture is refluxed for 6 hours. After cooling, the precipitated 2,3-dichloro-5,6-dicyanohydroquinone is filtered off and washed with 5 ml. of dioxane. The filtrate is then evaporated to dryness in vacuo and worked up as in Example 16 to give 6-methyl-$\Delta^{1,4,6}$-pregnatriene-16$\alpha$,17$\alpha$-diol-3,20-dione 16$\alpha$,17$\alpha$-acetonide.

*Example 23.—$\Delta^{1,4,6}$-pregnatriene-16$\alpha$,17$\alpha$-diol-3,20-dione 16,17-acetophenonide*

To a warm solution of 1.0 g. of $\Delta^{1,4}$-pregnadiene-16$\alpha$,17$\alpha$-diol-3,20-dione 16,17-acetophenonide in 70 ml. of t-butanol, 1.8 g. of chloranil is added and the mixture refluxed for 3 hours. After cooling the mixture is filtered and the filtrate evaporated to dryness, in vacuo. The residue is dissolved in 60 ml. of ether and washed three times with 30 ml. portions of water, then four times with 30 ml. portions of 5% sodium hydroxide and then again with water until neutral. The ether solution is dried over sodium sulfate, filtered and evaporated to dryness. Chromatography of the residue on Woelm neutral alumina as described in Example 16 gives $\Delta^{1,4,6}$-pregnatriene-16$\alpha$,17$\alpha$-diol-3,20-dione 16,17-acetophenonide.

*Example 24.—16$\alpha$,17$\alpha$-chloral derivative of $\Delta^{1,4,6}$-pregnatriene-16$\alpha$,17$\alpha$-diol-3,20-dione*

Following the procedure of Example 23, but substituting an equivalent amount of the 16$\alpha$,17$\alpha$-chloral derivative of $\Delta^{1,4}$-pregnadiene-16$\alpha$,17$\alpha$-diol-3,20-dione for the 16,17-acetophenonide, the 16$\alpha$,17$\alpha$-chloral derivative of $\Delta^{1,4,6}$-pregnatriene-16$\alpha$,17$\alpha$-diol-3,20-dione is obtained.

*Example 25.—Dicyclopropyl ketone derivative of $\Delta^{1,4,6}$-pregnatriene-16$\alpha$,17$\alpha$-diol-3,20-dione*

Following the procedure of Example 23, but substituting an equivalent amount of the 16$\alpha$,17$\alpha$-dicyclopropyl ketone derivative of $\Delta^{1,4}$-pregnadiene-16$\alpha$,17$\alpha$-diol-3,20-dione for the acetophenonide, the dicyclopropyl ketone derivative of $\Delta^{1,4,6}$-pregnatriene-16$\alpha$,17$\alpha$-diol-3,20-dione is obtained.

Similarly, the methyl isobutyl ketone derivative, the cyclopropyl phenyl ketone derivative, the cyclohexyl methyl ketone derivative, the 1,1,1-trifluoroacetonide derivative, the heptafluorobutanal derivative, the p-chloroacetophenone derivative, the p-nitroacetophenone derivative, the benzaldehyde derivative, the furfural derivative, the benzophenone derivative, the 2-acetylfuran derivative and the acetonide derivative of $\Delta^{1,4}$-pregnadiene-16$\alpha$,17$\alpha$-diol-3,20-dione, yield the methyl isobutyl ketone, the cyclopropyl phenyl ketone, the cyclohexyl methyl ketone, the 1,1,1-trifluoroacetonide, the heptafluorobutanal, the p-chloroacetophenone, the p-nitroacetophenone, the benzaldehyde, the furfural, the benzophenone, the 2-acetylfuran and the acetonide derivatives of $\Delta^{1,4,6}$-pregnatriene-16$\alpha$,17$\alpha$-diol-3,20-dione, respectively.

*Example 26.—6-chloro-$\Delta^{1,4,6}$-pregnatriene-16$\alpha$,17$\alpha$-diol-3,20-dione 16,17-acetonide*

To a warm solution of 1.0 g. of 6$\beta$-chloro-$\Delta^{1,4}$-pregnadiene-16$\alpha$,17$\alpha$-diol-3,20-dione 16,17-acetonide in 70 ml. of t-butanol, 1.8 g. of chloranil is added and the mixture is refluxed for 3 hours. After cooling the mixture is filtered and the filtrate worked up as in Example 23 to give 6-chloro-$\Delta^{1,4,6}$-pregnatriene-16$\alpha$,17$\alpha$-diol-3,20-dione 16,17-acetonide.

*Example 27.—6-fluoro-$\Delta^{1,4,6}$-pregnatriene-16$\alpha$,17$\alpha$-diol-3,20-dione 16,17-acetonide*

Following the procedure of Example 26 but substituting 1.0 g. of 6$\alpha$-fluoro-$\Delta^{1,4}$-pregnadiene-16$\alpha$,17$\alpha$-diol-3,20-dione 16,17-acetonide for the 6-chloro-compound, 6-fluoro-$\Delta^{1,4,6}$-pregnatriene-16$\alpha$,17$\alpha$-diol-3,20-dione 16,17-acetonide is obtained.

*Example 28.—6-bromo-$\Delta^{1,4,6}$-pregnatriene-16$\alpha$,17$\alpha$-diol-3,20-dione 16,17-acetonide*

Following the procedure of Example 26 but substituting 1.0 g. of 6$\alpha$-bromo-$\Delta^{1,4}$-pregnadiene-16$\alpha$,17$\alpha$-diol-3,20-dione 16,17-acetonide for the 6-chloro compound, 6-bromo-$\Delta^{1,4,6}$-pregnatriene-16$\alpha$,17$\alpha$-diol-3,20-dione 16,17-acetonide is obtained.

Similarly, 6$\beta$-fluoro-$\Delta^{1,4}$-pregnadiene-16$\alpha$,17$\alpha$-diol-3,20-dione 16,17-acetophenonide, 16$\alpha$,17$\alpha$-(2'-butylidene)-6$\beta$-fluoro-$\Delta^{1,4}$-pregnadiene-16$\alpha$,17$\alpha$-diol-3,20-dione, 16$\alpha$,17$\alpha$-(4'-methyl-2'-pentylidene)-6$\beta$-chloro-$\Delta^{1,4}$-pregnadiene-16$\alpha$,17$\alpha$-diol-3,20-dione, 16$\alpha$,17$\alpha$-cyclohexylidene-6$\beta$-fluoro-$\Delta^{1,4}$-pregnadiene-16$\alpha$,17$\alpha$-diol-3,20-dione and 16$\alpha$,17$\alpha$-(3'-pentylidene)-6$\beta$-fluoro-$\Delta^{1,4}$-pregnadiene-16$\alpha$,17$\alpha$-diol-3,20-dione yield their respective $\Delta^{1,4,6}$-pregnatriene derivatives.

*Example 29.—6-methyl-$\Delta^{1,4,6}$-pregnatriene-16$\alpha$,17$\alpha$-diol-3,20-dione 16,17-acetonide*

To a solution of 1.0 g. of 6$\alpha$-methyl-$\Delta^{1,4}$-pregnadiene-16$\alpha$,17$\alpha$-diol-3,20-dione 16,17-acetonide in 70 ml. of t-butanol, 1.8 g. of chloranil is added and the mixture is refluxed for 3 hours. After cooling, the mixture is filtered and the filtrate worked up as in Example 23 to give 6-methyl-$\Delta^{1,4,6}$-pregnatriene-16$\alpha$,17$\alpha$-diol-3,20-dione 16$\alpha$,17$\alpha$-acetonide.

*Example 30.—$\Delta^{1,4,6}$-pregnatriene-16$\alpha$,17$\alpha$-diol-3,20-diol*

A solution of 900 mg. of $\Delta^{1,4,6}$-pregnatriene-16$\alpha$,17$\alpha$-diol-3,20-dione 16,17-acetonide in 15 ml. of 90% formic acid is heated at 42° for 22 hours. The solvents are removed in vacuo, the crude residue dissolved in 50 ml. of methanol and treated under nitrogen with stirring with 10 ml. of a 10% oxygen-free solution of potassium carbonate in water. After 13 minutes at room temperature the mixture is neutralized with 1 ml. of glacial acetic acid and the solution concentrated in vacuo after the addition of water. Extraction with chloroform followed by drying over sodium sulfate and evaporation in vacuo furnishes a residue which on recrystallization from 95% ethanol furnishes about 200 mg. of pure $\Delta^{1,4,6}$-pregnatriene-16$\alpha$,17$\alpha$-diol-3,20-dione.

*Example 31.—6-fluoro-$\Delta^{1,4,6}$-pregnatriene-16$\alpha$,17$\alpha$-diol-3,20-dione*

Following the procedure of Example 30 but substituting an equivalent amount of 6-fluoro-$\Delta^{1,4,6}$-pregnatriene-16$\alpha$,17$\alpha$-diol-3,20-dione 16,17-acetonide for the $\Delta^{1,4,6}$-pregnatriene-16$\alpha$,17$\alpha$-diol-3,20-dione 16,17-acetonide, 6-fluoro-$\Delta^{1,4,6}$-pregnatriene-16$\alpha$,17$\alpha$-diol-3,20-dione is obtained.

*Example 32.—6-chloro-$\Delta^{1,4,6}$-pregnatriene-16$\alpha$,17$\alpha$-diol-3,20-dione*

Following the procedure of Example 30 but substituting an equivalent amount of 6-chloro-$\Delta^{1,4,6}$-pregnatriene-16$\alpha$,17$\alpha$-diol-3,20-dione 16,17-acetonide for the $\Delta^{1,4,6}$-pregnatriene-16$\alpha$,17$\alpha$-diol-3,20-dione 16,17-acetonide, 6-chloro-$\Delta^{1,4,6}$-pregnatriene-16$\alpha$,17$\alpha$-diol-3,20-dione is obtained.

Similarly, 6-bromo-$\Delta^{1,4,6}$-pregnatriene-16$\alpha$,17$\alpha$-diol-3,20-dione 16,17-acetonide yields 6-bromo-$\Delta^{1,4,6}$-pregnatriene-16$\alpha$,17$\alpha$-diol-3,20-dione.

*Example 33.—6-methyl-$\Delta^{1,4,6}$-pregnatriene-16$\alpha$,17$\alpha$-diol-3,20-dione*

Following the procedure of Example 30, but substituting an equivalent amount of 6-methyl-$\Delta^{1,4,6}$-pregnatriene-16$\alpha$,17$\alpha$-diol-3,20-dione 16,17-acetonide for the $\Delta^{1,4,6}$-pregnatriene-16$\alpha$,17$\alpha$-diol-3,20 16,17-acetonide, 6-methyl-$\Delta^{1,4,6}$-pregnatriene-16$\alpha$,17$\alpha$-diol-3,20-dione is obtained.

Similarly, 6-methyl-$\Delta^{1,4,6}$-pregnatriene-16$\alpha$,17$\alpha$-diol-3,20-dione 16,17-acetonide yields 6-ethyl-$\Delta^{1,4,6}$-pregnatriene-16$\alpha$,17$\alpha$-diol-3,20-dione.

*Example 34.*—$\Delta^{1,4,6}$-*pregnatriene-16α,17α-diol-3,20-dione-16,17-acetonide*

To a suspension of 500 mg. of $\Delta^{1,4,6}$-pregnatriene-16α, 17α-diol-3,20-dione in 75 ml. of acetone is added 0.05 ml. of 72% perchloric acid and the mixture is agitated at room temperature for three hours. The mixture is then neutralized with dilute sodium bicarbonate and the acetone removed in vacuo. The resulting crystalline suspension is filtered and the crystals washed with water to yield, after recrystallization from acetone, $\Delta^{1,4,6}$-pregnatriene-16α,17α-diol-13,20-dione 16,17-acetonide.

Similarly, the 6-halo-$\Delta^{1,4,6}$-pregnatriene-16α,17α-diol-3,20-diones and 6-(lower alkyl)-$\Delta^{1,4,6}$-pregnatriene-16α,17α-diol-3,20-diones can be converted to their acetonide derivatives. Moreover, by substituting other aldehydes and ketones for the acetone in Example 34, the other acetals and ketals of this invention can be prepared.

The invention may be variously otherwise embodied within the scope of the appended claims.

What is claimed is:
1. A compound of the formula

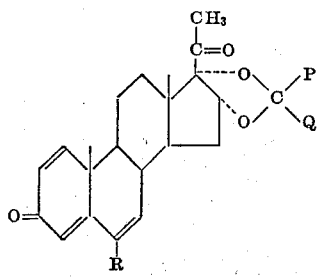

wherein R is halogen; P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; and together with the carbon to which they are joined P and Q is selected from the group consisting of a monocyclic cycloalkyl and a monocyclic heterocyclic radical.

2. 6-halo $\Delta^{1,4,6}$-pregnatriene - 16α,17α - diol-3,20-dione 16,17-acetonide.

3. 6-halo $\Delta^{1,4,6}$-pregnatriene - 16α,17α - diol-3,20-dione 16,17-acetophenonide.

4. 6-chloro-$\Delta^{1,4,6}$-pregnatriene - 16α,17α-diol-3,20-dione 16,17-acetonide.

5. 6-fluoro-$\Delta^{1,4,6}$-pregnatriene - 16α,17α-diol-3,20-dione 16,17-acetonide.

6. 6-fluoro $\Delta^{1,4,6}$-pregnatriene-16α,17α - diol-3,20-dione 16,17-acetophenonide.

References Cited by the Examiner
UNITED STATES PATENTS 3,107,240   10/1963   Ringold et al. _____ 260—239.55
3,192,203   6/1965   Ringold et al. _____ 260—239.55

OTHER REFERENCES

Chemistry and Engineering News, Sept. 16 (1957), pages 66 and 67.

LEWIS GOTTS, *Primary Examiner.*

LESLIE H. GASTON, ELBERT L. ROBERTS,
*Examiners.*

G. E. LANDE, *Assistant Examiner.*

UNITED STATES PATENT OFFICE
CERTIFICATE OF CORRECTION

Patent No. 3,234,214 February 8, 1966

Patrick A. Diassi et al.

It is hereby certified that error appears in the above numbered patent requiring correction and that the said Letters Patent should read as corrected below.

Column 4, lines 62, 63 and 73, and column 5, line 3, for "-dihydroxprogesterone", each occurrence, read -- -dihydroxyprogesterone --; column 6, line 34, for "filterate" read -- filtrate --; line 67, for "-3-3,20-dione" read -- -3,20-dione --; line 68, for "-$\Delta^{1,2,6}$-" read -- -$\Delta^{1,4,6}$- --; column line 19, for "6α,17α-" read -- 16α,17α- --; column 10, line 28, for "-diol", in italics, read -- -dione --, in italics; line 71, for "-3,20 16,17-" read -- -3,20-dione 16,17- --; column 11, line 11, for "-13,20-dione" read -- -3,20-dione --

Signed and sealed this 24th day of January 1967.

(SEAL)
Attest:

ERNEST W. SWIDER
Attesting Officer

EDWARD J. BRENNE
Commissioner of Patent

Notice of Adverse Decision in Interference

In Interference No. 95,584 involving Patent No. 3,234,214, P. A. Diassi and J. Fried, 6-HALO-$\Delta^{1,4,6}$-PREGNATRIENE-16$\alpha$, 17$\alpha$-DIOL-3, 20 DIONE 16, 17 ACETONIDE, final judgment adverse to the patentees was rendered Aug. 21, 1967, as to claims 1, 2, 3, 4, 5 and 6.

[*Official Gazette October 24, 1967.*]